US010708081B2

(12) United States Patent
Sun et al.

(10) Patent No.: US 10,708,081 B2
(45) Date of Patent: Jul. 7, 2020

(54) FAILURE PROTECTION METHOD BASED ON RING PROTECTION LINK, DEVICE, AND SYSTEM

(71) Applicant: Huawei Technologies Co., Ltd., Shenzhen, Guangdong (CN)

(72) Inventors: Luxiao Sun, Nanjing (CN); Tao Han, Nanjing (CN); Jiuming Li, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 277 days.

(21) Appl. No.: 15/657,046

(22) Filed: Jul. 21, 2017

(65) Prior Publication Data

US 2017/0324580 A1 Nov. 9, 2017

Related U.S. Application Data

(63) Continuation of application No. PCT/CN2016/071484, filed on Jan. 20, 2016.

(30) Foreign Application Priority Data

Jan. 23, 2015 (CN) .......................... 2015 1 0035077

(51) Int. Cl.
*H04L 12/437* (2006.01)
*H04L 12/24* (2006.01)

(52) U.S. Cl.
CPC ........ *H04L 12/437* (2013.01); *H04L 41/0668* (2013.01); *H04L 41/0686* (2013.01); *H04L 41/0816* (2013.01); *H04L 41/12* (2013.01)

(58) Field of Classification Search
CPC ............... H04L 12/437; H04L 41/0668; H04L 41/0686; H04L 41/12; H04L 41/0816;
(Continued)

(56) References Cited

U.S. PATENT DOCUMENTS 5,721,727 A * 2/1998 Ashi ....................... H04J 3/085
370/244
8,064,334 B2 * 11/2011 Zhao ....................... H04L 2/423
370/217

(Continued)

FOREIGN PATENT DOCUMENTS

CN 103636172 A 3/2014
CN 103888369 A 6/2014
(Continued)

*Primary Examiner* — Ivan O Latorre
(74) *Attorney, Agent, or Firm* — Womble Bond Dickinson (US) LLP

(57) ABSTRACT

Embodiments of the present disclosure provide a failure protection method based on a ring protection link, a device, and a system, and nodes in the ring protection link include a forwarding device in an SDN. The method includes: receiving, by a network controller, a high-priority failure message sent by a first node, where the failure message includes information used to indicate a failure; obtaining, according to the failure message, data information about port state changes that are of the nodes and that are caused by the failure; and sending a high-priority switching message to each of the nodes, so that each of the nodes updates a local MAC address table according to the switching message, where the switching message includes the data information about port state changes that are of the nodes and that are caused by the failure.

13 Claims, 7 Drawing Sheets

(58) Field of Classification Search
CPC ............. H04L 43/0817; H04L 67/1097; H04L 69/163; G06F 11/3409; G06F 3/067; G06F 3/0653; G06F 3/0619
See application file for complete search history.

(56) References Cited

U.S. PATENT DOCUMENTS

| | | | |
|---|---|---|---|
| 2008/0205303 A1* | 8/2008 | Izumi | H04L 12/437 370/258 |
| 2008/0316918 A1* | 12/2008 | Sakauchi | H04L 12/437 370/223 |
| 2009/0316571 A1 | 12/2009 | Rose | |
| 2010/0110881 A1* | 5/2010 | Ryoo | H04L 12/42 370/225 |
| 2012/0224471 A1* | 9/2012 | Vinod | H04L 43/0811 370/222 |
| 2013/0083647 A1* | 4/2013 | Xie | H04L 12/437 370/216 |
| 2014/0064060 A1 | 3/2014 | Kulambi | |
| 2014/0169223 A1* | 6/2014 | Kampmann | H04L 2/437 370/258 |
| 2014/0286173 A1* | 9/2014 | Bhandari | H04W 8/0236 370/238 |
| 2015/0249587 A1* | 9/2015 | Kozat | H04L 43/10 370/222 |

FOREIGN PATENT DOCUMENTS

| | | |
|---|---|---|
| CN | 104283790 A | 1/2015 |
| KR | 10-2009-0062082 A | 6/2009 |

* cited by examiner

FAILURE PROTECTION METHOD BASED ON RING PROTECTION LINK, DEVICE, AND SYSTEM

CROSS-REFERENCE TO RELATED APPLICATION

This application is a continuation of International Application No. PCT/CN2016/071484, filed on Jan. 20, 2016, which claims priority to Chinese Patent Application No. 201510035077.7, filed on Jan. 23, 2015. The disclosures of the aforementioned applications are hereby incorporated by reference in their entireties.

TECHNICAL FIELD

Embodiments of the present disclosure relate to communications technologies, and in particular, to a failure protection method based on a ring protection link, a device, and a system.

BACKGROUND

With explosive growth of mobile devices and content, a conventional network architecture is no longer able to meet current market requirements. Then, software-defined networking (SDN) has emerged to meet these requirements.

A ring protection link (RPL) includes multiple nodes, and a link between each two nodes is referred to as a sublink. In the conventional network architecture, if a failure occurs on a sublink, that is, a failed link, nodes at the two ends of the failed link both block ports corresponding to the failed link, and the two nodes periodically send signal fail (SF) packets, which are delivered to an RPL Owner by using another transmit node between each of the two nodes and the RPL Owner node. In addition, the nodes at the two ends of the failed link and the other transmit nodes that receive the SF packets update local Media Access Control (MAC) address tables. After receiving the foregoing SF packet, the RPL Owner unblocks a local slave port and updates a MAC address table to implement ring protection link switching upon the failure. If the nodes at the two ends of the failed link include a neighbor node of the RPL Owner, this node directly instructs the RPL Owner to unblock the local slave port and update the MAC address tables.

If failure protection is implemented on an RPL by using the foregoing prior art, an increase in complexity of the ring protection link causes an increase in a link switching time, which results in relatively poor network transmission performance.

SUMMARY

Embodiments of the present disclosure provide a failure protection method based on a ring protection link, a device, and a system, so as to implement quick ring protection link switching upon a failure in an SDN, and further improve network transmission performance.

According to a first aspect, an embodiment of the present disclosure provides a failure protection method based on a ring protection link, where nodes in the ring protection link include a forwarding device in a software-defined network SDN, and the method includes:
  receiving, by a network controller, a failure message sent by a first node, where a priority of the failure message is higher than that of another packet received by the network controller, the failure message includes information used to indicate a failure, and the first node is any one node in the ring protection link;
  obtaining, by the network controller, according to the failure message, data information about port state changes that are of the nodes and that are caused by the failure; and
  sending, by the network controller, a high-priority switching message to each of the nodes in the ring protection link, so that each of the nodes updates a local media access control MAC address table according to the switching message, to complete failure protection based on the ring protection link, where the switching message includes the data information about port state changes that are of the nodes and that are caused by the failure.

According to the first aspect, in a first possible implementation manner of the first aspect, the information used to indicate a failure includes port information corresponding to the failure, a MAC address of the first node, and a port number associated with the MAC address.

According to the first possible implementation manner of the first aspect, in a second possible implementation manner of the first aspect, the obtaining, by the network controller, according to the failure message, data information about port state changes that are of the nodes and that are caused by the failure includes:
  obtaining, by the network controller from the failure message, the port information corresponding to the failure, the MAC address of the first node, and the port number associated with the MAC address;
  computing, by the network controller, a network topology of the ring protection link according to the port information corresponding to the failure, the MAC address of the first node, and the port number associated with the MAC address, where the network topology includes the port state changes of the nodes; and
  updating, by the network controller according to the network topology, a MAC address table that corresponds to the nodes in the ring protection link.

According to a second aspect, an embodiment of the present disclosure provides a network controller, where the network controller is applied to a ring protection link, nodes in the ring protection link includes a forwarding device in a software-defined network SDN, and the network controller includes:
  a receiving module, configured to receive a failure message sent by a first node, where a priority of the failure message is higher than that of another packet received by the network controller, the failure message includes information used to indicate a failure, and the first node is any one node in the ring protection link;
  a processing module, configured to obtain, according to the failure message, data information about port state changes that are of the nodes and that are caused by the failure; and
  a sending module, configured to send a high-priority switching message to each of the nodes in the ring protection link, so that each of the nodes updates a local media access control MAC address table according to the switching message, to complete failure protection based on the ring protection link, where the switching message includes the data information about port state changes that are of the nodes and that are caused by the failure.

According to the second aspect, in a first possible implementation manner of the second aspect, the information used to indicate a failure includes port information corresponding to the failure, a MAC address of the first node, and a port number associated with the MAC address.

According to the first possible implementation manner of the second aspect, in a second possible implementation manner of the second aspect, the processing module is specifically configured to:

obtain, from the failure message, the port information corresponding to the failure, the MAC address of the first node, and the port number associated with the MAC address;

compute a network topology of the ring protection link according to the port information corresponding to the failure, the MAC address of the first node, and the port number associated with the MAC address, where the network topology includes the port state changes of the nodes; and update, according to the network topology, a MAC address table that corresponds to the nodes in the ring protection link.

According to a third aspect, an embodiment of the present disclosure provides a node, applied to a ring protection link, where the node is a forwarding device in a software-defined network SDN, and the node includes: a detection module, a processing module, a sending module, and a receiving module, where the detection module is configured to detect a failure;

the processing module is configured to block a port that is of the node and that corresponds to the failure when the detection module detects the failure;

the sending module is configured to send a high-priority failure message to a network controller, where the failure message includes information used to indicate the failure;

the receiving module is configured to receive a high-priority switching message sent by the network controller, where the switching message includes data information about port state changes that are of all nodes in the ring protection link and that are caused by the failure; and the processing module is further configured to update a local media access control MAC address table according to the switching message to complete failure protection based on the ring protection link.

According to the third aspect, in a first possible implementation manner of the third aspect, the information used to indicate the failure includes port information corresponding to the failure, a MAC address of the node, and a port number associated with the MAC address.

According to the third aspect or the first possible implementation manner of the third aspect, in a second possible implementation manner of the third aspect, the ring protection link further includes a non-SDN device interconnected with the SDN, and the processing module is further configured to:

after the detection module detects the failure, update the local MAC address table that has been stored in the node; and the sending module is further configured to send a signal fail SF packet to a neighbor node, where the SF packet is transferred by using the neighbor node of the node successively until all the nodes in the ring protection link complete protection against the failure, and the neighbor node includes the non-SDN device and/or the SDN device.

According to a fourth aspect, an embodiment of the present disclosure provides a system, including:

the network controller according to any one of the second aspect and the node according to any one of the third aspect.

In the embodiments of the present disclosure, a uniform control function of a network controller for forwarding devices in a network is utilized to implement application of an Ethernet ring protection switching (ERPS) feature in an SDN. Failure information is added to a high-priority failure message by a first node (that is a failed node), and reported by the first node to the network controller. The network controller performs centralized control to compute a network topology in a centralized manner, determine data information about port state changes that are of nodes in a ring protection link and that are caused by a failure, and send the data information to the nodes, so as to implement quick ring protection link switching upon a failure, enable a switched-to link quickly to restore communication between the nodes in the ring protection link, and further improve network transmission performance.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

SDN is an emerging network architecture based on separation of a control plane and a management plane, and the control plane is directly programmable. A conventional control plane is tightly bundled with each independent network device. A current control plane is a set of computing devices that are externally accessible. The control plane abstracts a lower-layer network for access by an upper-layer application or service. The upper-layer application or service may consider the lower-layer network as a logical or virtual entity.

Figure 1:
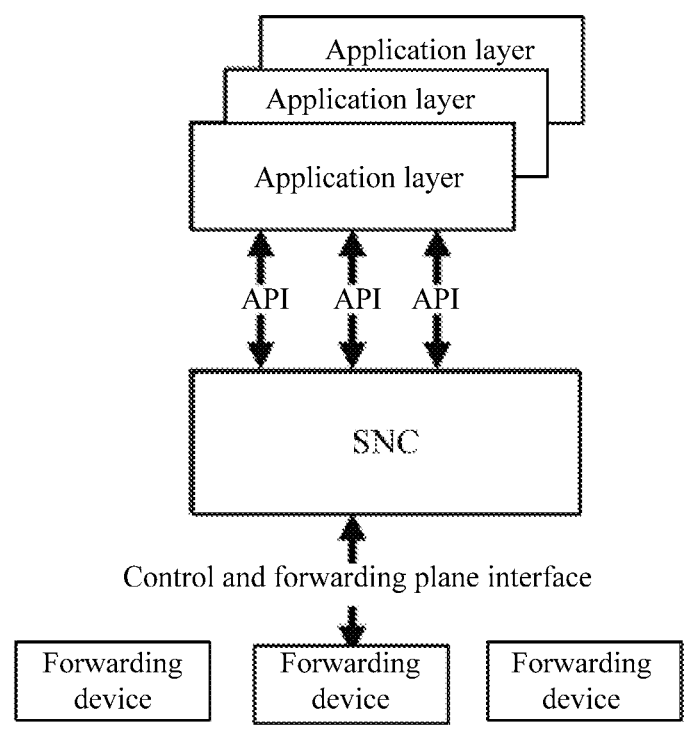
FIG. 1 is an example diagram of an application scenario according to Embodiment 1 of the present disclosure.

In an SDN in which control and forwarding are separated, devices are categorized as an SDN controller (SNC) and a forwarding device, that is, a switch. For example, as shown in FIG. 1, in the northbound direction, the SNC communicates with an application layer by using an application programming interface (API). In the southbound direction, the SNC connects to at least one forwarding device and performs, for the forwarding device, functions such as network resource scheduling, protocol control, topology management, policy defining, and table entry delivery. The forwarding device is mainly responsible for forwarding of network packets. The network packet is control information delivered by the SNC by using a southbound control and forwarding plane interface. The control and forwarding plane interface is, for example, a standard interface compliant with the OpenFlow protocol.

On this basis, the embodiments of the present disclosure provide a failure protection method based on a ring protection link, a device, and a system. An ERPS solution based on the embodiments of the present disclosure can not only implement quick ring protection link switching in an SDN in the event of various complex failures, but also implement quick ring protection link switching upon a failure in the case of ERPS protocol interworking between the SDN and a conventional network.

Figure 2:
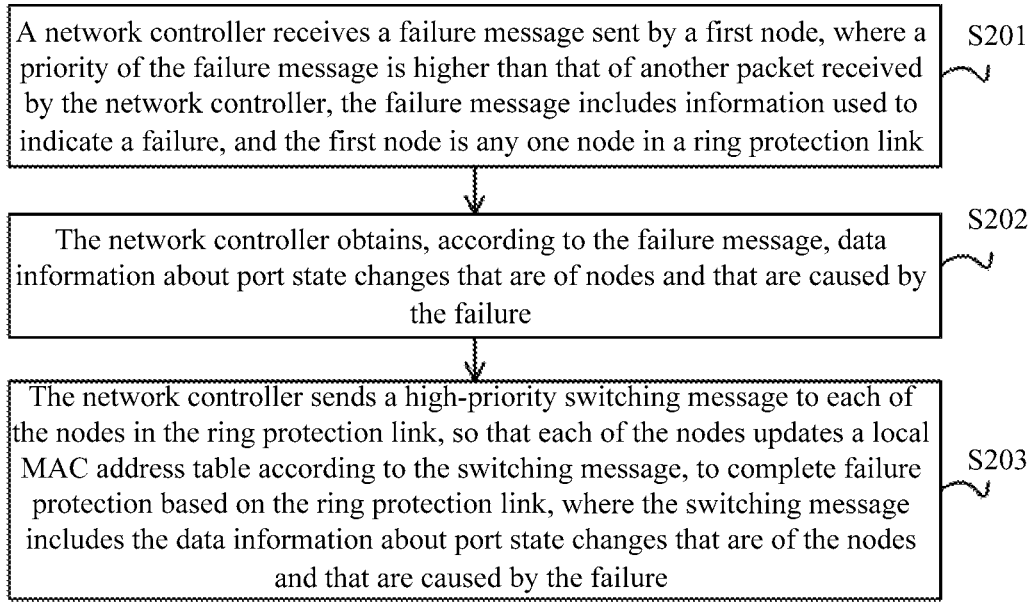
FIG. 2 is a flowchart of Embodiment 1 of a failure protection method based on a ring protection link according to the present disclosure.

FIG. 2 is a flowchart of Embodiment 1 of a failure protection method based on a ring protection link according to the present disclosure. This embodiment of the present disclosure provides a failure protection method based on a ring protection link. Nodes in the ring protection link include a forwarding device in an SDN. The method may be executed by a network controller such as an SNC. As shown in FIG. 2, the method includes the following steps.

S201: The network controller receives a failure message sent by a first node, where a priority of the failure message is higher than that of another packet received by the network controller, the failure message includes information used to indicate a failure, and the first node is any one node in the ring protection link.

The foregoing failure includes a failure of the first node itself and a failure of a link connected to the first node. The present disclosure is not specifically limited to one type.

In a normal state, a blocked link needs to be configured in the ring protection link to prevent formation of a loop. When another link fails, the blocked link is unblocked, and traffic is switched to a path on the other side of the ring protection link for transmission, thereby implementing switching protection.

Each forwarding device, such as a switch, in the ring protection link is referred to as a node. Of two ports of a node that are connected to the ring protection link, one port is a master port and the other port is a slave port. A role of a port is determined by user configuration. Each ring protection link has a master node. The master node is a decision maker that performs an operation after a network topology is changed.

When links in the ring protection link are all in a normal state, the master node blocks the slave port to prevent a data packet from being looped on a broadcast ring protection link in a ring topology. When there is a link that is in a failed state in the ring protection link, the master node unblocks the slave port to ensure that communication between the nodes on the ring protection link is not interrupted.

In a conventional network architecture, each node other than the master node in the ring protection link monitors a state of a local directly connected link, and notifies the master node of a link change via another node connected to the node, and then the master node decides a way of handling. This implementation manner may cause that failure switching protection takes a long time that exceeds a limit of 50 milliseconds. The 50-millisecond switching performance is subject to scenario constraints. The constraints include: a single instance, Ethernet fiber access interface/connectivity fault management (CFM) detection, a physical port (a satisfactory trunk interface is not provided), and the like.

In this embodiment of the present disclosure, every node in the ring protection link monitors a state of a local directly connected link. When it is detected that a local directly connected link fails, a node on which the local directly connected link failure is detected is referred to as a failed node. Herein, the first node is the failed node. The link on which the failure occurs is referred to as a failed link. The failed node blocks a port of the node at an end corresponding to the failed link, and sends a high-priority failure message to the network controller. The failure message includes information used to indicate the failure.

S202: The network controller obtains, according to the failure message, data information about port state changes that are of the nodes and that are caused by the failure.

Specifically, the network controller completes configuration and protocol computation of ERPS according to the failure message, to obtain the data information about port state changes that are of the nodes and that are caused by the failure.

S203: The network controller sends a high-priority switching message to each of the nodes in the ring protection link, so that each of the nodes updates a local MAC address table according to the switching message, to complete failure protection based on the ring protection link, where the switching message includes the data information about port state changes that are of the nodes and that are caused by the failure.

Switching messages corresponding to different failures have a same format, that is, a format of switching messages is fixed. However, a specific format is not limited in this embodiment of the present disclosure.

As a failure occurs on the ring protection link, a network topology is changed. To avoid a packet forwarding error, each of the nodes in the ring protection link needs to update a locally stored MAC address table.

In this embodiment, the network controller performs switching computation according to the failure message that is received by the network controller and that is sent by the first node, and a switching result obtained through computation is sent to all the nodes in the ring protection link in a form of a high-priority switching message. That is, the switching message is a response message corresponding to the failure message. Because control is centralized, the switching computation is performed in a centralized manner on the ring protection link in the entire network. In addition, high-performance computation of the network controller may be made full use of to obtain a computation result quickly. This can avoid the slow failure switching in a conventional network caused by switching computation based on device-by-device transfer of a failure message.

In this embodiment, the information used to indicate the failure may include port information corresponding to the failure, a MAC address of the first node, and a port number associated with the MAC address, and the present disclosure is not limited thereto. For example, the failure message may further include a name of a virtual local area network (VLAN) associated with the MAC address (VLAN name), a failure event type, the failed port, and port state information, information about a ring that the port joins, information about a neighbor port, and other information used to indicate the failure.

Optionally, S202 may include: the network controller obtains, from the failure message, the port information corresponding to the failure, the MAC address of the first node, and the port number associated with the MAC address; the network controller computes a network topology of the ring protection link according to the port information corresponding to the failure, the MAC address of the first node, and the port number associated with the MAC address, where the network topology includes port state changes of the nodes; and the network controller updates, according to the network topology, a MAC address table corresponding to the nodes in the ring protection link.

Figure 3:
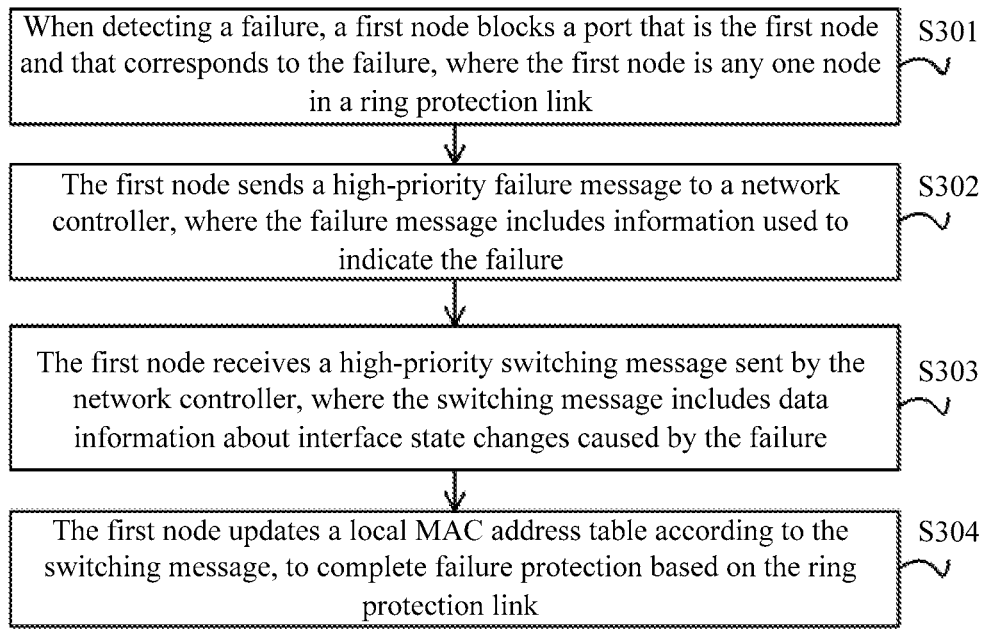
FIG. 3 is a flowchart of Embodiment 2 of a failure protection method based on a ring protection, link according to the present disclosure.

FIG. 3 is a flowchart of Embodiment 2 of a failure protection method based on a ring protection link according to the present disclosure. This embodiment of the present disclosure provides a failure protection method based on a ring protection link. The method corresponds to the method embodiment shown in FIG. 2. The method may be implemented in a manner of software and/or hardware, and executed by, for example, a forwarding device such as a switch. In this embodiment of the present disclosure, nodes in the ring protection link include a forwarding device in an SDN. As shown in FIG. 3, the method includes the following steps.

S301: When detecting a failure, a first node blocks a port that is of the first node and that corresponds to the failure, where the first node is any one node in the ring protection link.

In the SDN, an SNC controls forwarding devices in the network in a centralized manner. Therefore, a failed node executes S302 to send a high-priority failure message to a network controller, that is, the SNC. The SNC is used as an example for description in this embodiment of the present disclosure, but the present disclosure is not limited thereto.

S302: The first node sends a high-priority failure message to a network controller, where the failure message includes information used to indicate the failure.

Correspondingly, the SNC receives the failure message sent by the failed node, completes configuration and protocol computation of ERPS, and then delivers forwarding information to the forwarding device according to a computation result. That is, the SNC sends, to the nodes in the ring protection link, a high-priority switching message including data information about port state changes that are of the nodes and that are caused by the failure.

It should be noted that the failed node further sends a protocol packet received the failed node to the network controller, so that the network controller determines a transmission path for the protocol packet. In addition, the node may monitor the failure and cancel the blocking across boards, which is not limited in the present disclosure.

S303: The first node receives a high-priority switching message sent by the network controller, where the switching message includes the foregoing data information about port state changes caused by the failure.

For detailed description of the switching message, refer to the embodiment of the network controller side.

S304: The first node updates a local MAC address table according to the switching message, to complete failure protection based on the ring protection link.

It should be noted that the network controller sends the high-priority switching message to all forwarding devices (nodes) in the SDN, so that the first node and the nodes other than the first node in the SDN can all receive the switching message, and update their local MAC address tables according to the switching message, to complete failure protection based on the ring protection link.

As a failure occurs on the ring protection link, a network topology is changed. To avoid a packet forwarding error, each of the nodes in the ring protection link needs to update a locally stored MAC address table. In this step, each of the nodes obtains the updated MAC address table from the high-priority switching message sent by the network controller.

The method in this embodiment corresponds to the technical solution of the method embodiment shown in FIG. 2. Technical principles thereof are similar, and are not described herein again.

In this embodiment of the present disclosure, a central control function of a network controller for forwarding devices in a network is utilized to effectively implement application of an ERPS feature in an SDN. Failure information is added to a high-priority failure message by a first node (that is a failed node), and reported by the first node to the network controller. The network controller performs centralized control to compute a network topology in a centralized manner, determine data information about port state changes that are of nodes in a ring protection link and that are caused by a failure, and send the data information to the nodes in the ring protection link, so as to implement quick ring protection link switching upon a failure, enable a switched-to link quickly to restore communication between the nodes in the ring protection link, and further improve network transmission performance.

On a basis of the foregoing embodiment, the information used to indicate the failure includes at least port information corresponding to the failure, a MAC address of the first node, and a port number associated with the MAC address, and the present disclosure is not limited thereto. For example, the failure message may further include a name of a VLAN associated with the MAC address (VLAN name), a failure event type, the failed port, and port state information, information about a ring that the port joins, information about a neighbor port, and other information used to indicate the failure.

The nodes in the ring protection link may further include a non-SDN device interconnected with the SDN. After S301, the method may further include: the first node updates a local MAC address table that has been stored in the first node, and sends an SF packet to a neighbor node of the first node, where the SF packet is transferred by using neighbor nodes successively until all the nodes in the ring protection link complete protection against the failure, and the neighbor node includes the non-SDN device and/or an SDN device. The non-SDN device herein generally refers to a node that is in the SDN but not controlled by the SNC.

To ensure quick link switching for a ring protection link on which a failure occurs, the first node retains a processing solution for quick failure awareness switching on a forwarding plane in a conventional network. That is, after a device management module in the first node reports a port failure or after a detection protocol reports a link failure, the first node sends an SF for linkage actions, to block a port that is of the first node and that corresponds to the failure, flush the MAC address table, and send the SF packet to notify other nodes. This effectively ensures a link switching speed in the SDN and quick SF reporting to the non-SDN device, so that switching is completed synchronously.

In addition, to resolve that a the 50-ms switching performance requirement cannot be met in complicated scenarios such as port aggregation (trunk interface) or multiple rings, for example, intersecting rings and trapezoidal rings in a conventional network, the node directly sends the high-priority failure message to the SNC, to trigger a protocol to perform switching computation quickly, and a switching result obtained through computation is sent to the node by using a high-priority switching message. Because control is centralized, the switching computation is performed in a centralized manner on the ring protection link in the entire ERPS configuration. In addition, high-performance computation of the SNC may be made full use of to obtain a computation result quickly. This can avoid the slow switching in a conventional network caused by protocol computation based on device-by-device transfer of a failure message, and implement quick switching of an entire ring protection link when a failure occurs on the ring protection link.

On this basis, if the node is an owner node of the ring protection link, for example, an RPL Owner, after the owner node of the ring protection link receives the high-priority switching message sent by the network controller, the method may further include: the owner node of the ring protection link unblocks a local slave port to quickly enable a backup link to recover communication between the nodes in the ring protection link.

The following uses a specific embodiment to describe in detail the technical solutions of the method embodiments shown in FIG. 2 and FIG. 3.

Figure 4:
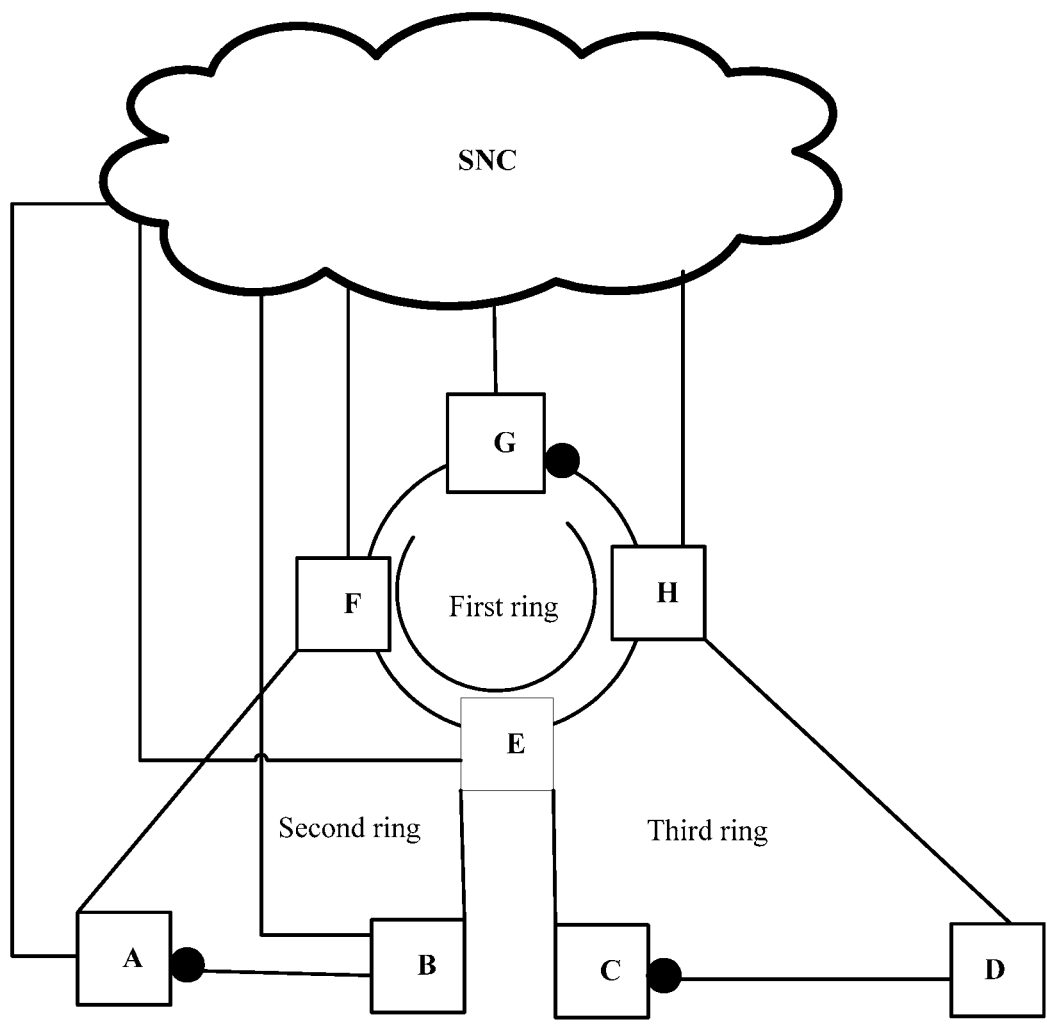
FIG. 4 is an example diagram of ERPS deployed in an SDN and a conventional network.

In this embodiment, that ERPS is deployed in an SDN and a conventional network as shown in FIG. 4 is used as an example. As shown in FIG. 4, a first ring protection link (a first ring for short) includes a node E, a node F, a node G, and a node H, where the node G is an RPL Owner of the first ring; a second ring protection link (a second ring for short) includes the node E, the node F, a node A, and a node B, where the node A is an RPL Owner of the second ring; a third ring protection link (a third ring for short) includes the node E, the node H, a node C, and a node D, where the node C is an RPL Owner of the third ring; and an SNC controls these nodes in a centralized manner, where the node C and the node D are non-SDN devices interconnected with the SDN, and the other nodes are forwarding devices in the SDN. A solid dot "•" is a G.8032 ring blocking point.

Figure 5:
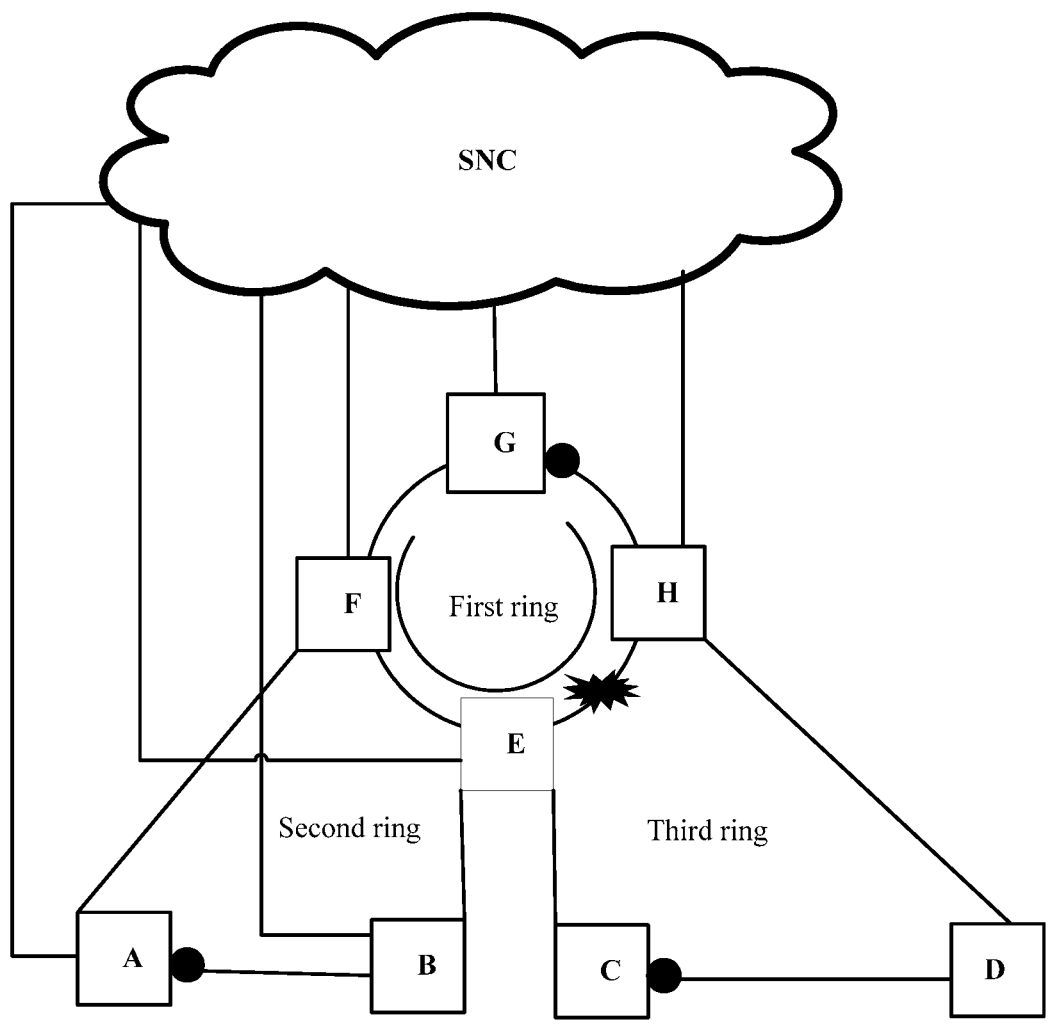
FIG. 5 is an example diagram of another application scenario according to an embodiment of the present disclosure.

When a link EH between the node E and the node H in a scenario shown in FIG. 4 fails, as shown in FIG. 5, in the scenario, the node E and the node H, are the first node, the link EH is a common link of the first ring and the third ring. Therefore, this embodiment of the present disclosure only describes a topology structure of nodes in the first ring and the third ring, and the node C and the node D in the third ring are non-SDN devices. For details of signaling interaction between the SNC and the nodes in this application scenario, refer to FIG. 6A and FIG. 6B.

Figure 6A:
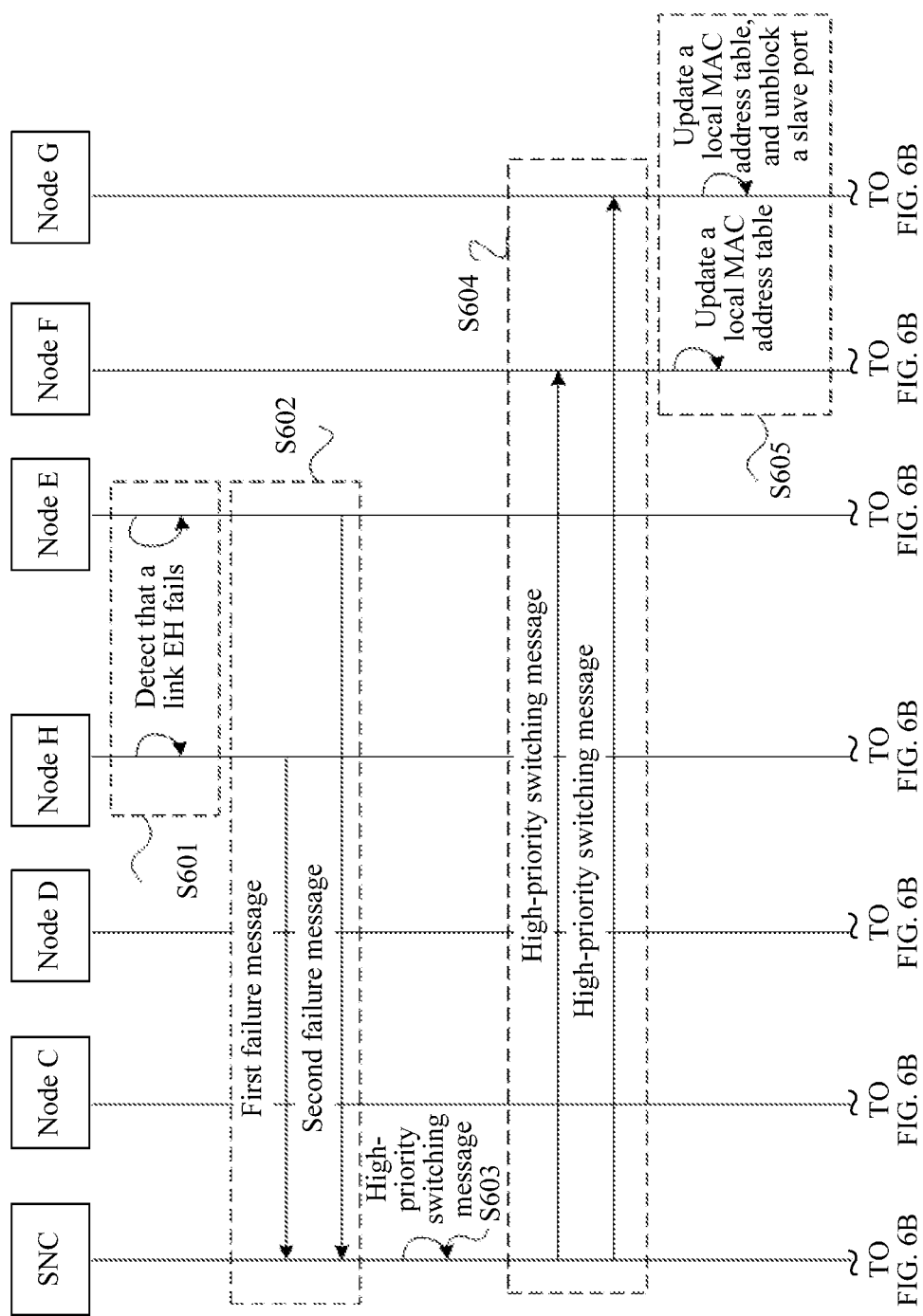
FIG. 6A and FIG. 6B is a signaling diagram of Embodiment 3 of a failure protection method based on a ring protection link according to the present disclosure.
Figure 6B:
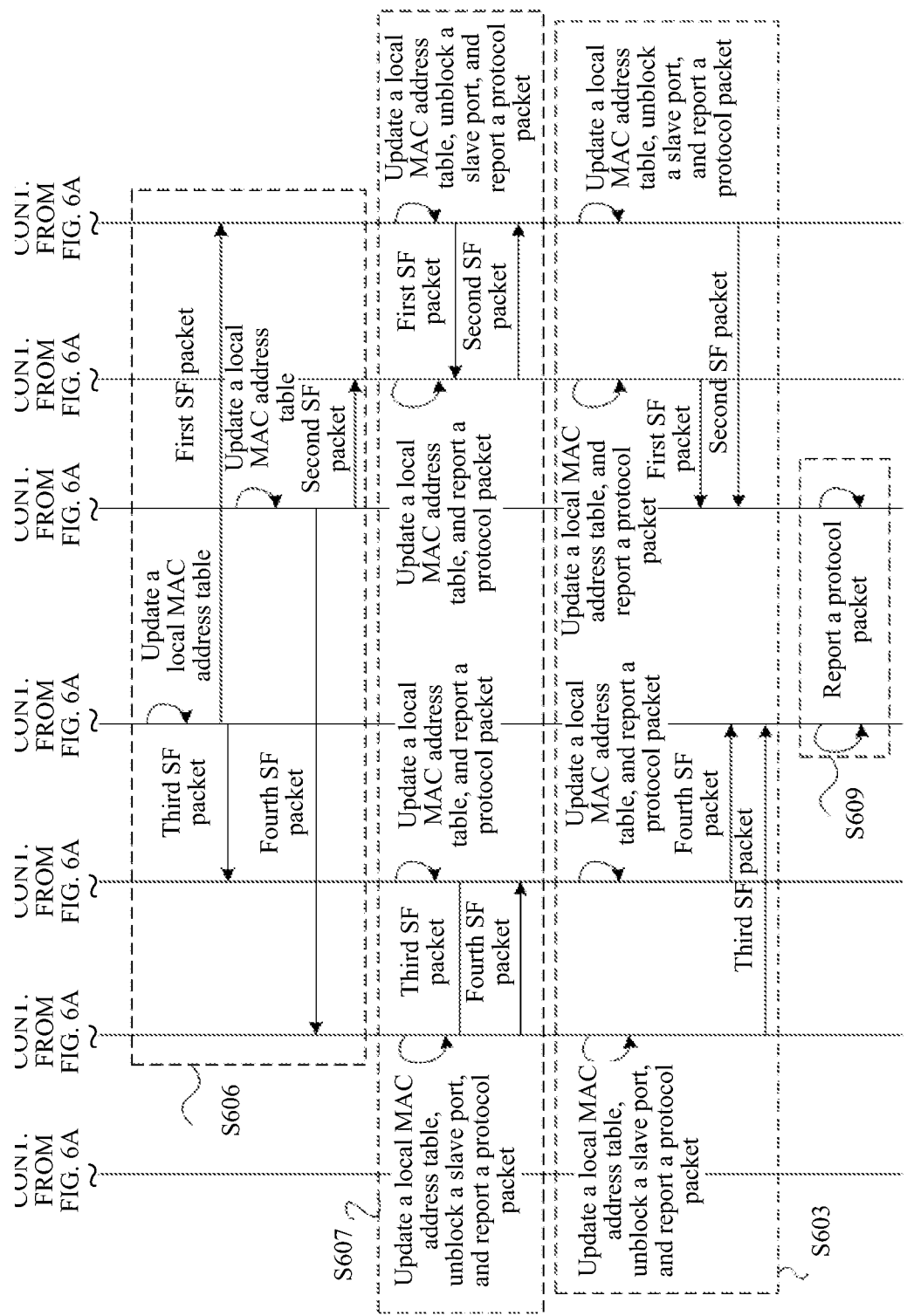

As shown in FIG. 6A and FIG. 6B, a failure protection method based on a ring protection link includes the following steps.

S601: The node H and the node E detect a failure on the link EH.

The following two processes, S602 to S605 and S606 to S609 are executed simultaneously in parallel.

S602: The node H sends a first failure message to an SNC, and the node E sends a second failure message to the SNC.

Herein, "first" and "second" are used to distinguish between the sending nodes.

S603: The SNC performs link switching computation according to the failure message sent by the node H and the node E, and generates a high-priority switching message according to a link switching result obtained through computation.

The failure message includes the first failure message and the second failure message.

S604: The SNC sends the high-priority switching message to the node G and the node F.

S605: The node G and the node F update local MAC address tables according to the switching message, where the node G further unblocks a slave port of the node G.

S606: For the first ring, the node H updates a local MAC address table, and sends, by using a link HG, a first SF packet to the neighbor node G; the node E updates a local MAC address table, and sends, by using a link EF, a second SF packet, to the neighbor node F. For the third ring, the node H updates a MAC address table, and sends, by using a link HD, a third SF packet to the neighbor node D; the node E updates a MAC address table, and sends, by using a link EC, a fourth SF packet to the neighbor node C.

S607: For the first ring, after receiving the first SF packet, the node G updates the local MAC address table, and unblocks the slave port of the node G, reports a protocol packet, and forwards the first SF packet to the node F; after receiving the second SF packet, the node F updates a local MAC address table, reports a protocol packet, and forwards the second SF packet to the node G. For the third ring, after receiving the fourth SF packet, the node C updates a local MAC address table, unblocks a slave port of the node C, reports a protocol packet, and forwards the fourth SF packet to the node D; after receiving the third SF packet, the node D updates a local MAC address table, reports a protocol packet, and forwards the third SF packet to the node C.

S608: For the first ring, after receiving the first SF packet, the node F updates a local MAC address table, reports a protocol packet, and forwards the first SF packet to the node E; after receiving the second SF packet, the node G updates the local MAC address table, unblocks the slave port, of the node G, reports a protocol packet, and forwards the second SF packet to the node H. For the third ring, after receiving the fourth SF packet, the node D updates the local MAC address table, reports a protocol packet, and forwards the fourth SF packet to the node H; after receiving the third SF packet, the node C updates a local MAC address table, unblocks the slave port of the node C, reports a protocol packet, and forwards the third SF packet to the node E.

S609: For the first ring, after receiving the first SF packet, the node E reports a protocol packet; after receiving the second SF packet, the node H reports a protocol packet. For the third ring, after receiving the third SF packet, the node E reports a protocol packet; after receiving the fourth SF packet, the node H reports a protocol packet.

It is additionally explained that in the embodiment shown in FIG. 6A and FIG. 6B, each node may perform link switching to complete corresponding failure protection immediately after receiving any packet (for example, a first packet, a second packet, a third packet, or a fourth packet) or a high-priority switching message. A packet or a high-priority switching message received subsequently regarding a same failure may be ignored without processing, and only needs to be forwarded to a neighbor node. For example, for the node F, if the high-priority switching message is first received, the node F may ignore the first SF packet and the second SF packet received subsequently, and only forwards the first SF packet to the neighbor node E and forwards the second SF packet to the neighbor node G.

Figure 7:
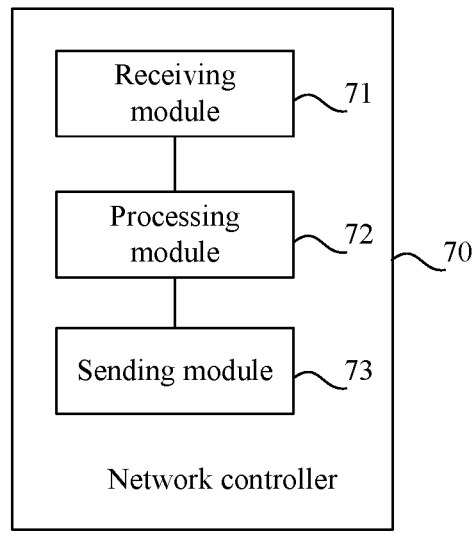
FIG. 7 is a schematic structural diagram of Embodiment 1 of a network controller according to the present disclosure.

FIG. 7 is a schematic structural diagram of Embodiment 1 of a network controller according to the present disclosure. This embodiment of the present disclosure provides a network controller, applied to a ring protection link, where nodes in the ring protection link include a forwarding device in an SDN. As shown in FIG. 7, the network controller 70 includes: a receiving module 71, a processing module 72, and a sending module 73.

The receiving module 71 is configured to receive a failure message sent by a first node, where a priority of the failure message is higher than that of another packet received by the network controller 70, and the failure message includes information used to indicate a failure. The processing module 72 is configured to obtain, according to the failure message, data information about port state changes that are of the nodes and that are caused by the failure, where the first node is any one node in the ring protection link. The sending module 73 is configured to send a high-priority switching message to each of the nodes in the ring protection link, so that each of the nodes updates a local MAC address table according to the switching message, to complete failure protection based on the ring protection link, where the switching message includes the data information about port state changes that are of the nodes and that are caused by the failure.

The network controller in this embodiment may be used to execute the technical solution in the method embodiment shown in FIG. 2. Implementation principles and technical effect thereof are similar, and details are not described herein again.

In the foregoing embodiment, the information used to indicate the failure may include port information corresponding to the failure, a MAC address of the first node, a port number associated with the MAC address, and the like.

Further, the processing module 72 may be specifically configured to: obtain, from the failure message, the port information corresponding to the failure, the MAC address of the first node, and the port number associated with the MAC address; compute a network topology of the ring protection link according to the port information corresponding to the failure, the MAC address of the first node, and the port number associated with the MAC address, where the network topology includes port state changes of the nodes; and update, according to the network topology, a MAC address table corresponding to the nodes in the ring protection link.

Figure 8:
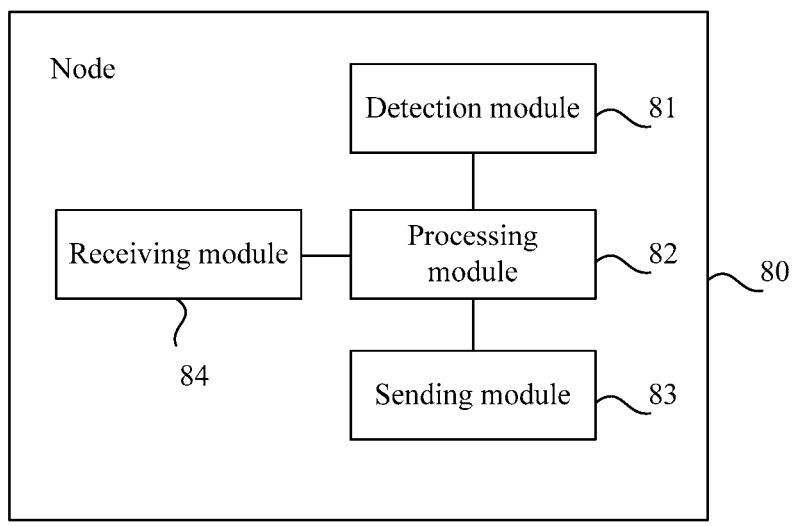
FIG. 8 is a schematic structural diagram of Embodiment 1 of a node according to the present disclosure.

FIG. 8 is a schematic structural diagram of Embodiment 1 of a node according to the present disclosure. This embodiment of the present disclosure provides a node, applied to a ring protection link. The node is a forwarding device in an SDN. As shown in FIG. 8, the node 80 includes a detection module 81, a processing module 82, a sending module 83, and a receiving module 84.

The detection module 81 is configured to detect a failure. The processing module 82 is configured to block a port that is of the node 80 and that corresponds to the failure when the detection module 81 detects the failure. The sending module 83 is configured to send a high-priority failure message to a network controller, where the failure message includes information used to indicate the failure. The receiving module 84 is configured to receive a high-priority switching message sent by the network controller, where the switching message includes data information about port state changes that are of all nodes in the ring protection link and that are caused by the failure. The processing module 82 is further configured to update a local MAC address table according to the switching message, to complete failure protection based on the ring protection link.

The node in this embodiment may be configured to execute the technical solution of the method embodiment shown in FIG. 3. Implementation principles and technical effect thereof are similar, and details are not described herein again.

On a basis of the foregoing embodiment, the information used to indicate the failure may include port information corresponding to the failure, a MAC address of the node, a port number associated with the MAC address, and other information.

Further, the ring protection link may further include a non-SDN device interconnected with the SDN. In this case, the processing module 82 may be further configured to: after the detection module 81 detects the failure, update a local MAC address table that has been stored in the node. Optionally, the sending module 83 may be further configured to send an SF packet to a neighbor node, and transfer the SF packet successively by using the neighbor node of the node until all the nodes in the ring protection link complete protection against the failure, and the neighbor node may include the non-SDN device and/or an SDN device.

It is additionally explained that persons skilled in the art may understand the foregoing sending module as a transmitter, the processing module as a processor, and the receiving module as a receiver. The transmitter and the receiver may be integrated into one, that is, a transceiver.

An embodiment of the present disclosure further provides a system. The system includes the network controller according to any one of the foregoing embodiments and the node according to any one of the foregoing embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A failure protection method based on a ring protection link, wherein nodes in the ring protection link comprise a forwarding device in a software-defined network SDN, the method comprising:

receiving, by a network controller, a failure message sent by a first node, wherein a priority of the failure message is higher than that of another packet received by the network controller, the failure message comprises information used to indicate a failure, and the first node is any one of nodes in the ring protection link;

obtaining, by the network controller, according to the failure message, data information about port state changes that are of the nodes and that are caused by the failure; and sending, by the network controller, a high-priority switching message to each of the nodes in the ring protection link, so that each of the nodes updates a local media access control (MAC) address table according to the switching message, to complete failure protection based on the ring protection link, wherein the switching message comprises the data information about port state changes that are of the nodes and that are caused by the failure,
wherein the ring protection link further comprises a non-SDN device interconnected with the SDN and the first node comprises an SDN device.

2. The method according to claim 1, wherein the information used to indicate a failure comprises port information corresponding to the failure, a MAC address of the first node, and a port number associated with the MAC address.

3. The method according to claim 2, wherein obtaining, by the network controller, according to the failure message, data information about port state changes that are of the nodes and that are caused by the failure comprises:
obtaining, by the network controller from the failure message, the port information corresponding to the failure, the MAC address of the first node, and the port number associated with the MAC address;
computing, by the network controller, a network topology of the ring protection link according to the port information corresponding to the failure, the MAC address of the first node, and the port number associated with the MAC address, wherein the network topology comprises the port state changes of the nodes; and
updating, by the network controller according to the network topology, a MAC address table that corresponds to the nodes in the ring protection link.

4. A network controller, wherein the network controller is applied to a ring protection link, nodes in the ring protection link comprises a forwarding device in a software-defined network (SDN), the network controller comprising:
a receiver, configured to receive a failure message sent by a first node, wherein a priority of the failure message is higher than that of another packet received by the network controller, the failure message comprises information used to indicate a failure, and the first node is any one node in the ring protection link;
a processor, configured to obtain, according to the failure message, data information about port state changes that are of the nodes and that are caused by the failure; and
a transmitter, configured to send a high-priority switching message to each of the nodes in the ring protection link, so that each of the nodes updates a local media access control (MAC) address table according to the switching message, to complete failure protection based on the ring protection link, wherein the switching message comprises the data information about port state changes that are of the nodes and that are caused by the failure,
wherein the ring protection link further comprises a non-SDN device interconnected with the SDN and the first node comprises an SDN device.

5. The network controller according to claim 4, wherein the information used to indicate a failure comprises port information corresponding to the failure, a MAC address of the first node, and a port number associated with the MAC address.

6. The network controller according to claim 5, wherein the processor is configured to:
obtain, from the failure message, the port information corresponding to the failure, the MAC address of the first node, and the port number associated with the MAC address;
compute a network topology of the ring protection link according to the port information corresponding to the failure, the MAC address of the first node, and the port number associated with the MAC address, wherein the network topology comprises the port state changes of the nodes; and
update, according to the network topology, a MAC address table that corresponds to the nodes in the ring protection link.

7. A node, applied to a ring protection link, wherein the node is a forwarding device in a software-defined network (SDN), the node comprising:
a processor configured to detect a failure and to block a port of the node that corresponds to the failure when the failure is detected;
a transmitter configured to send a high-priority failure message to a network controller, wherein the failure message comprises information used to indicate the failure;
a receiver configured to receive a high-priority switching message sent by the network controller, wherein the switching message comprises data information about port state changes that are of all nodes in the ring protection link and that are caused by the failure; and
wherein the processor is further configured to update a local media access control (MAC) address table according to the switching message to complete failure protection based on the ring protection link; and
wherein the ring protection link further comprises a non-SDN device interconnected with the SDN and the node comprises an SDN device.

8. The node according to claim 7, wherein the information used to indicate the failure comprises port information corresponding to the failure, a MAC address of the node, and a port number associated with the MAC address.

9. The node according to claim 7, wherein:
the processor is further configured to:
after detecting the failure, update the local MAC address table that has been stored in the node; and
the transmitter is further configured to:
send a signal fail SF packet to a neighbor node, wherein the SF packet is transferred by using the neighbor node of the node successively until all the nodes in the ring protection link complete protection against the failure, and the neighbor node comprises the non-SDN device and/or an SDN device.

10. The node according to claim 8, wherein:
the ring protection link further comprises a non-SDN device interconnected with the SDN;
the processor is further configured to:
after detecting the failure, update the local MAC address table that has been stored in the node; and
the transmitter is further configured to:
send a signal fail SF packet to a neighbor node, wherein the SF packet is transferred by using the neighbor node of the node successively until all the nodes in the ring protection link complete protection against the failure, and the neighbor node comprises the non-SDN device and/or an SDN device.

11. A system, comprising:
a network controller and a node;
wherein the network controller is configured to:
receive a failure message sent by a node, wherein a priority of the failure message is higher than that of another packet received by the network controller, the failure message comprises information used to indicate a failure, and the node is any one node in the ring protection link, obtain, according to the failure message, data information about port state changes that are of the nodes and that are caused by the failure, and send a high-priority switching message to each of the nodes in the ring protection link, so that each of the nodes updates a local media access control (MAC) address table according to the switching message, to complete failure protection based on the ring protection link, wherein the switching message comprises the data information about port state changes that are of the nodes and that are caused by the failure; and wherein the node is a forwarding device in a software-defined network (SDN), and the node is configured to:

detect a failure, block a port that is of the node and that corresponds to the failure when the failure is detected, send the high-priority failure message to the network controller, wherein the failure message comprises the information used to indicate the failure, receive the high-priority switching message sent by the network controller, and update the local media access control MAC address table according to the switching message to complete failure protection based on the ring protection link; and wherein the ring protection link further comprises a non-SDN device interconnected with the SDN and the node comprises an SDN device.

12. The system according to claim 11, wherein the information used to indicate a failure comprises port information corresponding to the failure, a MAC address of the first node, and a port number associated with the MAC address.

13. The system according to claim 11, wherein:

the node is further configured to:

after detecting the failure, update the local MAC address table that has been stored in the node, and send a signal fail (SF) packet to a neighbor node, wherein the SF packet is transferred by using the neighbor node of the node successively until all the nodes in the ring protection link complete protection against the failure, and the neighbor node comprises at least one of the non-SDN device and an SDN device.

* * * * *